June 29, 1948.  A. H. GRAHAM  2,444,252
LOAD MEASURING SYSTEM
Filed Feb. 18, 1946
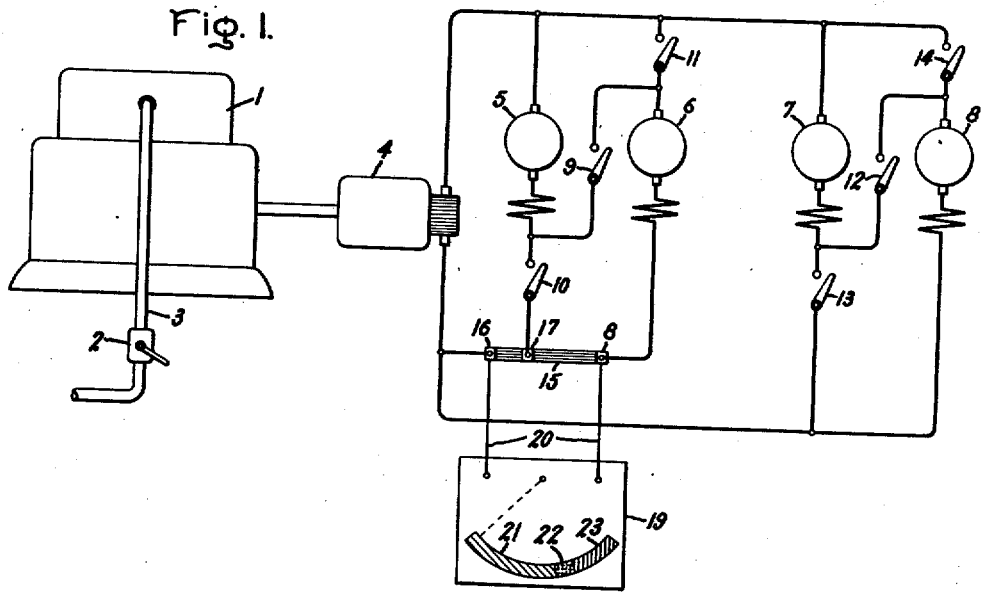
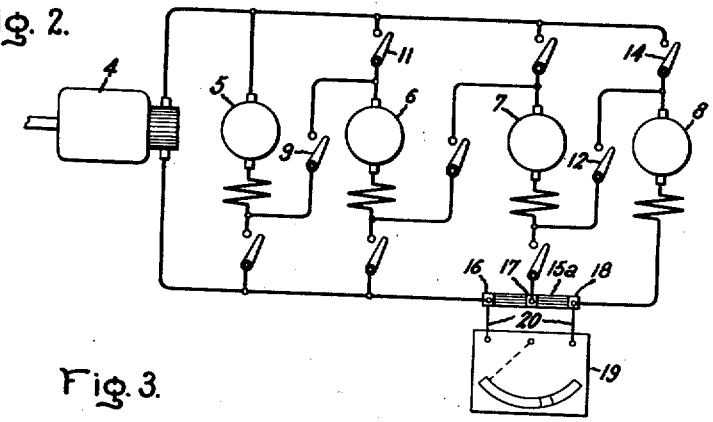
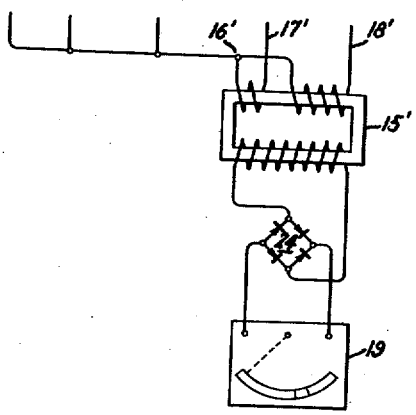
Inventor:
Ansel H. Graham,
by Prowell P. Mack
His Attorney.

Patented June 29, 1948

2,444,252

UNITED STATES PATENT OFFICE 2,444,252

LOAD MEASURING SYSTEM

Ansel H. Graham, Wesleyville, Pa., assignor to General Electric Company, a corporation of New York Application February 18, 1946, Serial No. 648,486

6 Claims. (Cl. 177—311)

My invention relates to unitary means for obtaining a correct measurement of the load on power apparatus when such apparatus is operated under two or more different conditions, and is particularly useful for measuring the load on the electric power system of an internal power electric-locomotive under different operating conditions.

A common type of internal power-electric locomotive is powered by a Diesel engine which drives an electric generator which supplies electric energy to one or more pairs of electric driving motors, which are connected in series relation for low speed operation and in parallel for high speed operation. It so happens that with low speed operation the most severe loading comes on the motors and with high speed operation the most severe loading comes on the generator so far as heating caused by load currents is concerned. It is desirable that the operator shall know at all times, and regardless of the motor connection used, of any overload current condition and the severity of such condition in order that he may operate the equipment to good advantage but in a manner which will prevent damage. My invention relates to a single current indicating system having special connections with the load circuits for correctly indicating the degree of current loading of the motors in the low speed connection and of the generator in the high speed connection. The instrument and shunt connections are permanent and require no change in connections by the operator in addition to the change in connections of the motors themselves.

The features of my invention which are believed to be novel and patentable will be pointed out in the claims appended hereto. For a better understanding of my invention, reference is made in the following description to the accompanying drawing in which Fig. 1 represents my invention as applied to a four-motor power system having high and low speed connections. Fig. 2 shows its application to another four-motor power system having high, low, and intermediate speed connections; and Fig. 3 shows features of the invention for use with alternating currents.

In the drawing, 1 represents a Diesel engine or some other form of prime mover the output of which may be controlled as by a valve 2 in its fuel supply line 3. The engine drives a direct current generator represented at 4, and the generator is adapted to supply electric energy to one or more pairs of similar direct current series driving motors through the connections indicated, the motors being designated by numbers 5, 6, 7, and 8. Motors 5 and 6 constitute one pair which may be connected in series to generator 4 by closing a switch 9 and opening switches 10 and 11 or in parallel to generator 4 by closing switches 10 and 11 and opening switch 9. Similarly, motors 7 and 8 may be connected in series to generator 4 by closing a switch 12 and opening switches 13 and 14 or in parallel to the generator by opening switch 12 and closing switches 13 and 14. For low speed operation of the locomotive the motors of a pair are connected in series and the two pairs in parallel with switches 9 and 12 closed and the other switches open. Under this low speed operating condition the limiting load comes on the motors rather than on the generator. To give a practicable example, assume a generator with a continuous full load rating of 1440 amperes and motors with a continuous full load rating of 480 amperes. Then at low speed with the two-series, two-parallel connection the generator supplies 960 amperes, and a current of 480 amperes flows in each motor. For the high speed connection with all four motors in parallel and 1440 ampers in the generator, each motor will carry 360 amperes. It is thus evident that in the latter connection the limiting load comes on the generator, so that attention must be paid to the generator current to prevent overheating of the generator.

One way of measuring the motor current on the low speed connection and the generator current on the high speed connection would be to provide two current measuring systems each properly connected to measure the currents in question. This is undesirable if it can be avoided because of the extra equipment and space required and the nuisance of requiring the operator to observe two meters. According to my invention a single unitary metering equipment is used which accurately indicates the load condition for both high and low speed connections without the necessity for the operator to change meter connections or make any interpretation of the meter readings.

This is accomplished by providing what may be termed a double or compound shunt 15 having three line terminal connections 16, 17, and 18 and the usual instrument connections connected to a millivoltmeter 19 through instrument shunt leads 20. The line connections of the shunt are such that the series or low speed current from one pair of the motors 5 and 6 flows through the complete length of the shunt between terminals 16 and 18, while in the high speed connection the current of motor 6 flows through the complete length of the shunt and the current from motor 5 flows through only a selected length portion of the shunt between terminals 16 and 17. When both currents flow in the same direction, they flow in the same direction and hence adding instrument voltage drop is produced. In the example given above and designating the resistance of the shunt as R, the terminal 17 should be so placed that the shunt resistance between terminals 17 and 18 is ⅔ R and that between terminals 16 and 17 is ⅓ R. Now in the low speed connection with switches 10, 11, 13, and 14 open and with full load current of 480 amperes per motor, the voltage across the instrument terminals of the shunt will be 480 R. In the high speed connection and full load current on the generator of 1440 amperes, the voltage drop across shunt terminals 17 and 18 will be 360×⅔ R and that across terminals 16 and 17 will be 720×⅓ R, so that the total voltage drop will be

360×⅔ R+720×⅓ R=240 R+240 R=480 R

It is thus seen that full load current on the motors during low speed operation and full load current on the generator during high speed operation will produce the same reading of instrument 19.

Higher and lower motor and generator loads for the low and high speed connections will produce higher and lower instrument readings in the same proportion as above specified, so that for the low speed connection the instrument 19 correctly indicates motor loading and for the high speed connection instrument 19 correctly indicates generator loading in terms of continuous full load current rating of motors and generator, respectively. It is assumed of course that the similar motors will draw similar currents simultaneously regardless of the connection or loading, and this is a sound assumption. The instrument 19 is preferably provided with a scale divided into three different colored portions such as a green portion 21, a yellow portion 22, and a red portion 23, indicating respectively underload, full load, and overload. The metering accuracy will be high since the metering connections are permanent. Thus, the operator always has available an accurate indication of the limiting load conditions of the entire electrical equipment on a single scale and he does not need to know or think of whether the motors are connected for high or low speed when being guided by this indication to get the most out of the locomotive without overloading. In case the instrument pointer moves into the red zone of the scale, the operator may reduce load as for example by reducing the fuel supply to the prime mover 1 by throttling valve 2.

The invention is generally applicable to other series, parallel combinations of load circuits. It is readily apparent that it is applicable to installations like Fig. 1 but with one pair of or more than two pairs of similar motors and with other appropriate current ratings.

Fig. 2 represents a combination essentially like that of Fig. 1 but with provision for adding another control step in which all four motors may be connected in series. Such connection will become the lowest speed connection and the connection where two pairs of motors are connected in series and two pairs in parallel will be the intermediate speed connection and, with all motors in parallel, the high speed connection.

Here again the limiting load will generally come on the motors with the lowest speed connection and on the generator with the highest speed connection. The limiting load for the intermediate speed connection will ordinarily come on the motors. Assume that the maximum continuous current rating of the motors is 600 amperes and of the generator 1600 amperes. The generator rating corresponds to 400 amperes per motor for the high speed connection. Hence, we should use a compound shunt and instrument combination which gives a reading proportional to motor current on the low speed connection and a reading proportional to generator current on the high speed connection, which readings are equal for full load rated current of motor and generator respectively. Accordingly, a compound shunt 15a is connected as shown in Fig. 2. In the low speed connection the series motor current flows through all the motors and the entire shunt from between terminals 16 and 18 and produces a voltage drop of 600 R for full load current. In the high speed connection the current of motor 8 only flows through the entire shunt and produces a voltage drop of 400 R for full load current on the generator and the current of motor 7 flows between terminals 16 and 17 and produces an additional voltage drop of 400 RX where X is a fraction corresponding to the resistance of the shunt between terminals 16 and 17 divided by the resistance between terminals 16 and 18.

These high and low speed connection voltage drops are to be equal so that

600 R=400 R+400 RX

X=½

Hence, terminal 17 is at the mid resistance point between terminals 16 and 18. The shunt voltage drop is indicated by a load calibrated instrument 19 as before and so far as the safe loading of the electrical equipment is concerned, it is the only instrument which the operator needs to observe.

In Fig. 2 assume that the motor 5 is omitted, that the full load motor rating is 400 amperes, the full load generator rating is 1050 amperes, and that the three motors are arranged to be connected either in series or in parallel to the generator. In this case we would need to have a shunt at 18 where the resistance between points 16 and 17 would be one-seventh of the total resistance of the shunt. Other applications of the invention will readily occur to those skilled in the art.

In the case of installation employing alternating current equipment, it might be preferable to use a compound current transformer rather than a compound shunt. Fig. 3 represents such a transformer which could be used in Fig. 2 with alternating current. The line terminals to the transformer marked 16', 17', and 18' would be connected to the motor circuits as are terminals 16, 17 and 18, respectively, of Fig. 2. The primary winding between terminals 16' and 18' has twice as many turns as the primary winding between terminals 16' and 17'. The voltages produced by these primary windings in the secondary winding add. The same direct current indicating instrument 19 as used in Fig. 2 may be used in Fig. 3 by employing a full wave rectifier 24 between the secondary winding of the transformer and the instrument. It is hardly necessary to say that the primary winding currents are assumed to be and to remain in phase. In an alternating current power system an induction regulator might take the place of the generator.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In an electric power system wherein electric power apparatus supplies load current to a plurality of similar electric load devices which are adapted to be connected to such apparatus in at least two different relations such that with one such connection limiting load current of one value flows through the load devices and with the other such connection limiting load current of a different value flows through said power apparatus, means for producing measurement voltages proportional to the different limiting load currents on the system for the corresponding connections comprising compound means having a pair of instrument terminals for producing a measurement voltage in response to load currents, said means having current load terminals for permanent connection in one portion of said power system to produce one ratio of current to voltage response and current load terminals for permanent connection in another portion of said power system to produce a different ratio of current to voltage response such that the same measurement voltage is produced thereby at the instrument terminals for the different limiting load currents of the corresponding connecting relations.

2. In an electric power system wherein an electric generator supplies load current to a plurality of similar electric load circuits which load circuits are adapted to be connected to the generator in series with limiting load current of one value therein or in parallel with limiting load current of a different value in the generator, means for producing measurement voltages proportional to such different limiting load current values on the system for the corresponding connections comprising compound means having a pair of instrument terminals for producing a measurement voltage in response to load currents, said means having load current terminals and adapted to be permanently connected in a series circuit connection of said power system to produce one ratio of current to voltage response and adapted to be permanently connected in parallel circuit connections of said power system to produce another ratio of current to voltage response, such that the same measurement voltage is produced at the instrument terminals for the different limiting load currents of the corresponding connections.

3. In an electric power system wherein an electric generator supplies a plurality of pairs of similar motors simultaneously, the motors of each pair being adapted to be connected to the generator in series with limiting load current of one value on the motors and to the generator in parallel with limiting load current of a greater value on the generator, and compound means having a pair of instrument terminals and a plurality of load current terminals for producing measurement voltages proportional to such limiting load currents for the corresponding connections, said means being adapted to be permanently connected in the series and parallel circuit load connections at different overall current to voltage response ratios, such that the over-all current to voltage response ratio thereof is reduced when the change from series to parallel connection of said motors is made, said ratios being such that the same instrument terminal voltage is produced for the different limiting load currents of the corresponding connections.

4. In an electric power system wherein a generator of a given full load current rating supplies a plurality of similar motors of a lower full load current rating and wherein the motors may be connected to the generator in at least two relations, one where the full load current rating of the motors may be exceeded with less than full load current on the generator and the other where the full load current rating of the generator may be exceeded with less than full load current on the motors, and a unitary current measuring system permanently connected to such power system for indicating the current loading of the motors in terms of motor current rating when using the first mentioned connection and for indicating the current loading of the generator in terms of generator current rating when using the second mentioned connection.

5. In an electric power system wherein a generator of a given current rating simultaneously supplies a plurality of similar load devices each with a lower current rating, and wherein the load devices may be connected to said generator, first, such that the full load current rating of the load devices may be exceeded with less than full load current on the generator and, second, such that the full load current rating of the generator may be exceeded with less than full load current on the load devices, a current measuring shunt having current load terminals at its two ends and at a selected intermediate point between its ends permanently connected in said power system such that the current through one of said load devices flows through the entire length of the shunt for both the first and second mentioned connections and the current through one of said load devices flows through a selected partial length portion of said shunt only during the second mentioned connection, said shunt producing the same measurement voltage with both the first and second mentioned connections for full load current on the load devices and on the generator, respectively, and a measuring instrument connected across said shunt for indicating the limiting load condition of said system.

6. A power sytem comprising a generator, a plurality of similar motors each with a lesser full load current rating than the generator, connections for supplying all of said motors from the generator simultaneously, first, such that the motor current rating may be exceeded with less than full load current on the generator and, second, such that the generator current rating may be exceeded with less than full load current on the motors, a compound current measuring shunt permanently connected in one portion of said power system so as to produce one ratio of current to voltage drop response and permanently connected in another portion of said system to give a different ratio of current to voltage drop response, an instrument responsive to the measurement voltage drop of said shunt, said instrument having scale divisions representing under, full, and over current loadings. the shunt connections to said system and the response ratios thereof being selected so that the instrument correctly indicates motor current loading for the first mentioned connection and generator current loading for the second mentioned connection in terms of the full load motor and generator current ratings respectively.

ANSEL H. GRAHAM.

REFERENCES CITED

The following references are of record in the file of this patent:

UNITED STATES PATENTS

| Number | Name | Date |
|---|---|---|
| 1,114,515 | Pratt | Oct. 20, 1914 |